(12) United States Patent
Zipperer

(10) Patent No.: US 6,216,440 B1
(45) Date of Patent: Apr. 17, 2001

(54) STARTING DEVICE FOR MODEL JET ENGINES

(75) Inventor: Markus Zipperer, Staufen (DE)

(73) Assignee: Ingenieurbüro CAT M. Zipperer GmbH, Staufen (DE)

( * ) Notice: Subject to any disclaimer, the term of this patent is extended or adjusted under 35 U.S.C. 154(b) by 0 days.

(21) Appl. No.: 09/232,475

(22) Filed: Jan. 15, 1999

(51) Int. Cl.$^7$ .................................................. F02C 7/268

(52) U.S. Cl. .............................................. 60/39.142; 74/9

(58) Field of Search ............................... 60/39.142; 74/6, 74/7 R, 9

(56) References Cited

U.S. PATENT DOCUMENTS

| | | | |
|---|---|---|---|
| 1,466,926 | 9/1923 | Brisbois | 74/9 |
| 1,829,624 | 10/1931 | Abell | 74/9 |
| 2,626,655 | 1/1953 | Trautmann et al. | 60/39.142 |
| 2,663,994 | 12/1953 | Lombard et al. | 60/39.142 |

*Primary Examiner*—Louis J. Casaregola
(74) *Attorney, Agent, or Firm*—Thomas I. Rozsa; Tony D. Chen; Jerry Fong

(57) ABSTRACT

A device for starting the engine of model jet engines. The device includes an electric motor with a coupling mechanism, enables the electric motor to be coupled to the turbine and start the turbine in operation and thereafter, decouple from the turbine after the turbine of the engine has started rotating.

6 Claims, 2 Drawing Sheets

STARTING DEVICE FOR MODEL JET ENGINES

BACKGROUND OF THE INVENTION

1. Field of the Invention

The present invention relates to a device for starting the engine of model jet airplanes such as small gas turbines, in particular, the present invention represents a starting device for starting up of model jet engines such as small gas turbines as they are especially utilized in propulsion of model airplanes.

2. Description of the Prior Art

For the starting, especially start-up of these model gas turbines, various procedures have been known in the prior art. These include the following:

A. Starting by means of compressed air.

To attain the start up, especially the required revolutions per minute rate of the turbine, the running system of the gas turbine is brought to the necessary rate of revolutions per minute by means of highly compressed air. The compressed air necessary for this procedure is made available in practice mostly by means of compressed air tanks (such as scuba diver tanks). The disadvantage of this method consists in the fact that in the hobby utilization of the gas turbine the relatively heavy and bulky pressed air tank must be carried along. Also, the possible number of starts is reduced by the limited availability of compressed air. When the compressed air tank is empty, no further starts are possible, and the tank must be refilled by a service provider (specialized store or scuba shop). In addition, the compressed air tank musts be regularly evaluated and re-certified.

B. Startup by means of a blowing device such as a fan.

In this method, the turbine running system is triggered by means of a fan providing accelerated air to bring it to the required revolutions per minute. The air accelerated by the mostly electrically propelled fan is blown into the turbine entry and thus sets the running system of the turbine in rotation. The disadvantage of this method consists in the fact that the air stream/flow generated by the fan must be introduced to the turbine opening in a relatively large cross section (through a very large access hole). This creates in fact the need for a free access to the turbine such as turbine intake. However, this is difficult if not impossible to realize in the construction of turbines in model airplanes. A firm installation of the fan directly in front of the turbine is in many cases excluded, as after the start of the turbine the air supply is impeded by the starting fan which is always located in the stream of the airflow.

Moreover, it is necessary to cool the turbine immediately after shut off in order to avoid damage through overheating of the very expensive high velocity devices (such as the rotor assembly and bearings). This cooling procedure is hitherto also carried out by means of subjection of the turbine to compressed air or a fan (i.e. cooling air is blown through the turbine). But in the case of a remote landing of the model airplane, the cooling procedure is often impossible to carry out immediately after the shutting off of the turbine, and bearing damages through overheating are quite likely.

The present invention involves a starting procedure for model jet engines, which overcomes the above mentioned insufficiencies and disadvantages, and provide a secure and simply accessible start up for model jet engines, as well as to facilitate an immediate cooling after the turning off of the turbine.

SUMMARY OF THE INVENTION

By means of this invention the goal is attained through the fact that the turbine model can be started without external assistance. The connecting and disconnecting of the starting engine occurs independently by means of a connection or disconnection of the same. During running of the jet engine, no damages occur through the starter in case of remote landing. In case of a remote landing of the model, the turbine can be automatically cooled. In case of a "flame out", the turbine can also be restarted in flight. An optimal installation of the turbine in the model is attained. Construction limitations by means of the starting method are entirely removed.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
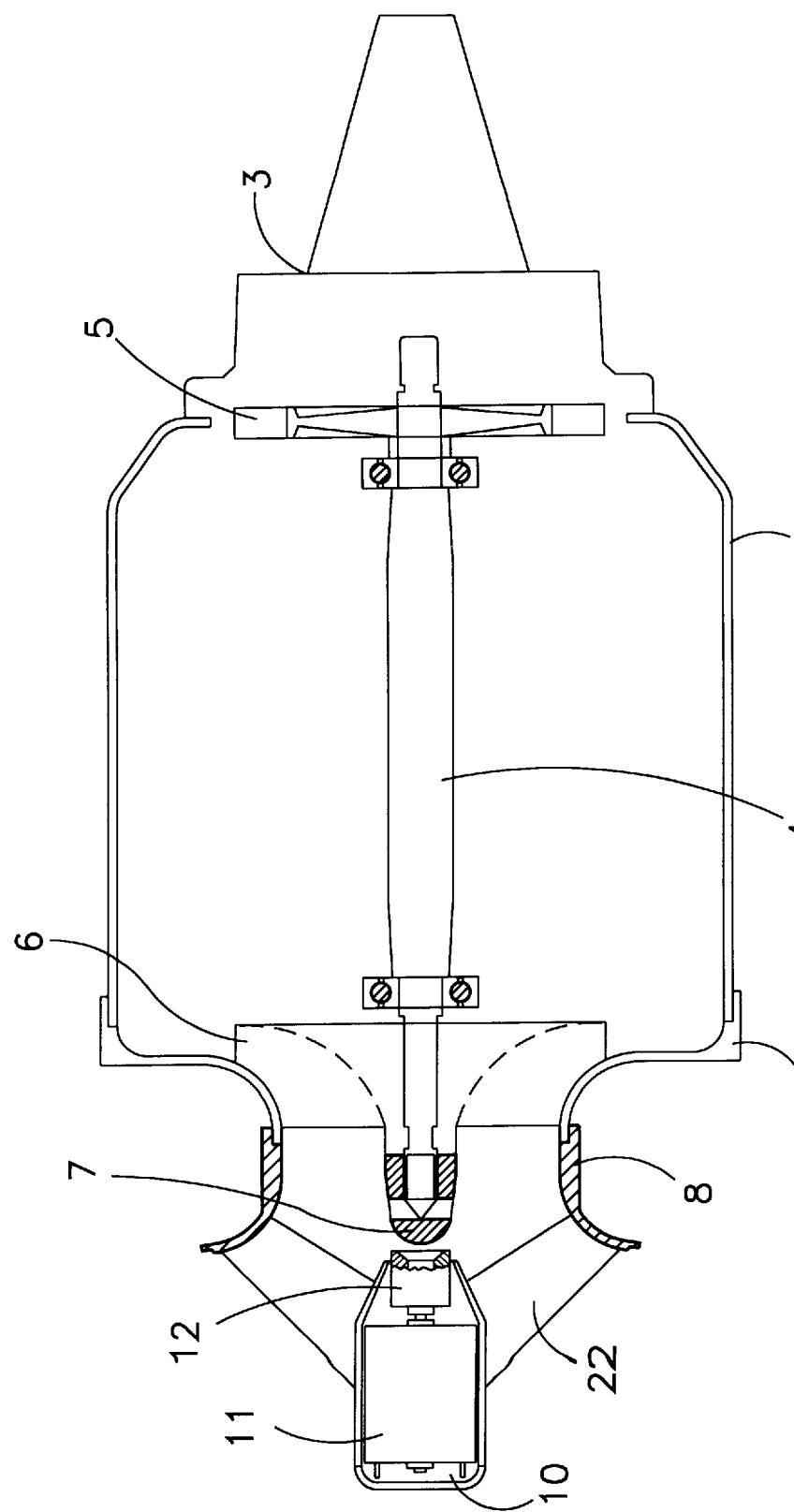
FIG. 1 is a cross-sectional view of a model jet engine which includes the present invention.
Figure 2:
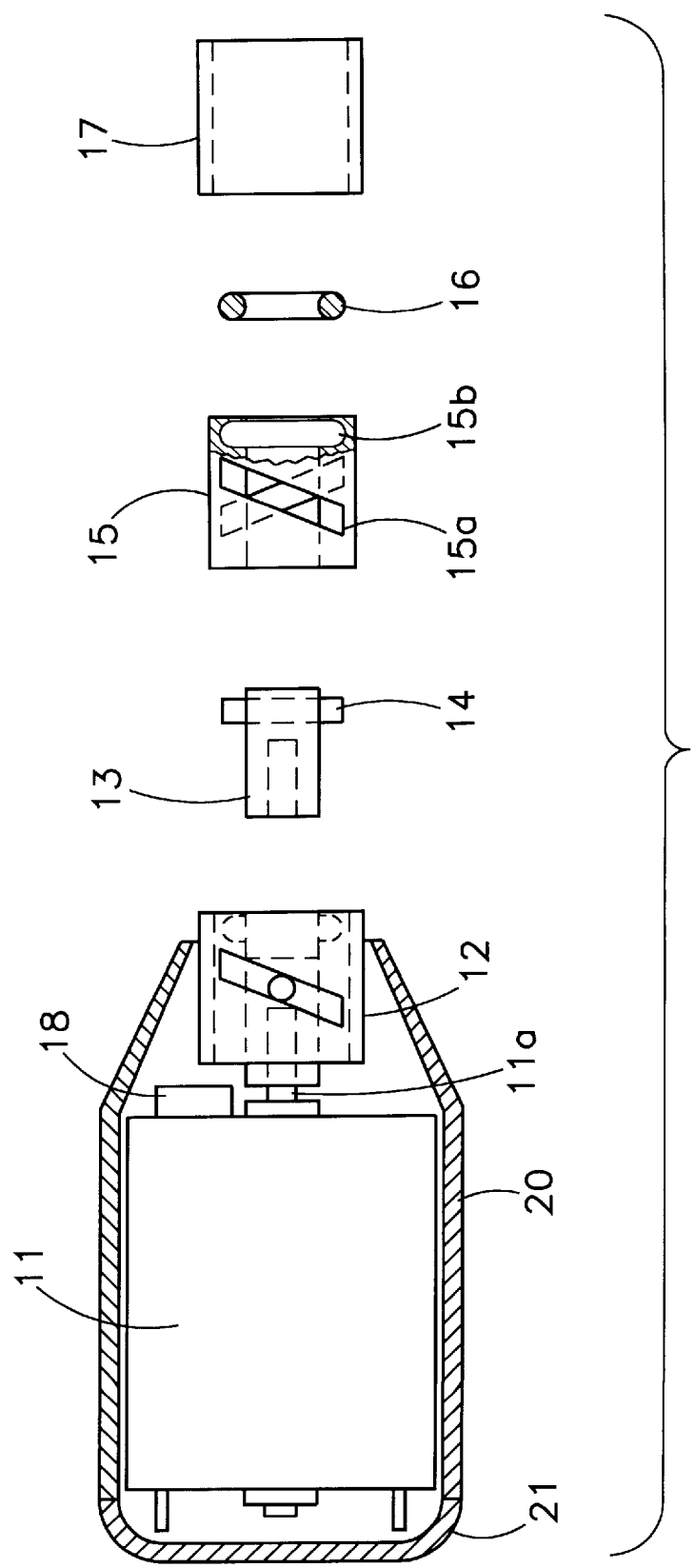
FIG. 2 is an exploded view of the present invention starting device for model jet engines.

A construction example of the invention is explained in FIGS. 1 and 2. FIG. 1 shows a model jet engine of the current design with a turbine casing 1, compressor cover 2, exhaust outlet 3, turbine shaft 4, turbine wheel 5, and compressor wheel 6. This turbine starting device is provided, over the intake funnel 8 with supporting ribs 22, the starting device 10 consisting of casing 20, casing lid 21, electric motor 11, and coupling device 12. The compressor nut 7 forms the second half of the coupling device and has a globe-like or conical frontal part in order to facilitate the coupling procedure. The turbine shaft 4 and electric motor 11 self align because their supporting ribs 22 are flexible. The coupling device 12 is in resting position, hence the jet engine is decoupled. When the electric motor 11 is energized, the coupling device 12 is caused to move toward the compressor nut 7 and engages the compressor nut 7 by a frictional means. (During lengthwise motion of the starting device on the turbine, then coupling device 12 is coupled to the compressor nut 7 over friction.) When power from the electric motor 11 is removed, a movement path away from the compressor nut 7 causes decoupling.

A particularly advantageous version of the present invention is illustrated in the exploded cross-sectional view of FIG. 2. The left side of the drawing shows an installed coupling device 12 with autonomous propeller coupling function, functionally ready on shaft 11a of the electric motor 11. To the right, represented again in exploded view, are the various component parts of this coupling device 12. On the shaft 11a of the electric motor 11, the carrier 13 is installed with cross-shaft 14. The propellor coupling function originates from the fact that the cross-shaft 14 glides in thread-like slots 15a of the coupling sleeve 15 and due to its mass inertia upon start-up of the electric motor 11 is screwed away from the electric motor 11 and toward the compressor nut 7. By means of this coupling procedure, the turbine shaft 4, turbine wheel 5 and compressor wheel 6 are set in a rotating motion by the electric motor 11. If the electric motor 11 is drastically stopped by means of short circuiting (or dynamic braking), or if the revolution speed of the turbine becomes greater than the revolution speed of the electric motor 11, the coupling device 12 moves toward the electric motor 11, which thereby opens the coupling. An additional material at the location between the coupling sleeve 15 and compressor nut 7, provides a means to reduce wear and tear by a frictional device. The device includes a retaining sleeve and an O-ring 16 or other suitable rubber or synthetic material, which can be utilized in the retaining sleeve 15b of the coupling sleeve 15, so that this part provides necessary friction and can be replaced when worn out. A protective ring 17 is introduced over the coupling sleeve 15 in order to prevent the possible contamination and impediment between the carrier 13, with cross-shaft 14 and coupling sleeve 15. In order to keep the starting device securely uncoupled during operation of the jet turbine, a permanent magnet 18 is applied to hold the protective ring 17, which in this case consists of ferro-magnetic material, in the disengaged position.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A starting device for use with a jet engine, comprising:
   a. said jet engine is a model jet engine having a turbine shaft and a turbine rotor;
   b. a coupling device having means for an axial motion which couples and uncouples with said turbine shaft, where the coupling device is centered on a rapidly-turning electric motor and engages a complementary coupling means positioned on said turbine shaft;
   c. said rapidly-turning electric motor spinning a coupling mechanism which moves axially in one direction for setting said turbine rotor into motion; and
   d. said coupling device further having a coupling sleeve movable by means of mass inertia along the axial direction and upon start-up of said electric motor, the coupling sleeve propelled in the direction of a compressor wheel, thereby contacting a compressor nut with a friction element which in turn rotates said turbine shaft, where said turbine rotor is set into motion.

2. The starting device in accordance with claim 1, wherein said coupling sleeve includes a replaceable O-ring which is a friction element.

3. The starting device in accordance with claim 2, wherein said replaceable O-ring contacts said compressor nut.

4. The starting device in accordance with claim 2, wherein said replaceable O-ring is made of rubber material.

5. The starting device in accordance with claim 2, wherein said replaceable O-ring is made of synthetic material.

6. The starting device in accordance with claim 1, further comprising a magnet for pulling back a movable protective ring axially and maintaining it at a greatest distance from said compressor nut.

\* \* \* \* \*